(12) United States Patent
Weaver

(10) Patent No.: US 11,997,186 B1
(45) Date of Patent: May 28, 2024

(54) SYSTEMS AND METHODS OF MINIMAL PERFECT HASHING WITH XORSAT FILTERS

(71) Applicant: The Government of the United States as represented by the Director, National Security Agency, Ft. George G. Meade, MD (US)

(72) Inventor: Sean A. Weaver, Baltimore, MD (US)

(73) Assignee: The Government of the United States represented by the Director, National Security Agency, Ft. George G. Meade, MD (US)

( * ) Notice: Subject to any disclaimer, the term of this patent is extended or adjusted under 35 U.S.C. 154(b) by 377 days.

(21) Appl. No.: 16/950,161

(22) Filed: Nov. 17, 2020

(51) Int. Cl.
*H04L 9/06* (2006.01)
(52) U.S. Cl.
CPC .................... *H04L 9/0643* (2013.01)
(58) Field of Classification Search
CPC ....... H04L 9/00; H04L 9/0643; H04L 9/3236; G06T 7/162; G06F 16/2255; G06F 16/137
See application file for complete search history.

(56) References Cited

U.S. PATENT DOCUMENTS

| | | | | |
|---|---|---|---|---|
| 9,317,218 B1* | 4/2016 | Botelho | ............... | G06F 16/1748 |
| 9,753,484 B1* | 9/2017 | Marek | ...................... | G06F 16/00 |
| 10,503,716 B2* | 12/2019 | Chase | ................. | G06F 16/2255 |
| 2009/0070354 A1* | 3/2009 | Chellapilla | ........... | H04L 9/3247 |
| 2013/0086004 A1* | 4/2013 | Chao | ................. | G06F 16/90344 |
| | | | | 707/E17.007 |
| 2013/0086017 A1* | 4/2013 | Chao | .................... | H04L 63/1416 |
| | | | | 707/698 |
| 2015/0058595 A1* | 2/2015 | Gura | ................... | G06F 12/1018 |
| | | | | 711/216 |
| 2015/0120754 A1* | 4/2015 | Chase | ................ | G06F 16/2255 |
| | | | | 707/747 |
| 2015/0169467 A1* | 6/2015 | Chase | ................ | G06F 12/1018 |
| | | | | 711/216 |
| 2016/0259724 A1* | 9/2016 | Steele, Jr. | ........... | G06F 12/0292 |
| 2016/0359631 A1* | 12/2016 | Nawaz | ............... | G06F 16/2255 |

OTHER PUBLICATIONS

"Weaver, Sean A., A Minimal Perfect Hash Function Construction Involving the Assignment problem and XORSAT Filters; Jun. 4, 2019, pp. 1-7" (Year: 2019).*
"Botelho et al., Minimal perfect hashing: A competitive method for indexing internal memory, Information Sciences, 2011, pp. 2608-2625" (Year: 2011).*

(Continued)

*Primary Examiner* — Oleg Korsak

(57) ABSTRACT

A computer-implemented method of constructing a minimal perfect hash function includes selecting a set H of k hash functions over a set Y of n keys and building a bipartite graph from keys to hash values using the set Y of keys and the set H of hash functions. Each edge of the bipartite graph has a weight equal to an index of a hash function associated with that edge. The method also includes determining a minimal weight perfect matching of the bipartite graph and generating an XORSAT filter using the minimal weight perfect matching of the bipartite graph, such that a minimal perfect hash function can be performed on an element by querying the XORSAT filter for a result associated with the element.

8 Claims, 7 Drawing Sheets

(56) References Cited

OTHER PUBLICATIONS

"Weaver et al., XOR-Satisfiability Set Membership Filters, 2018, pp. 1-18" (Year: 2018).*

Weaver, Sean A., A Minimal Perfect Hash Function Construction Involving the Assignment problem and XORSAT Filters; Jun. 4, 2019.

Heule, Marijn J.H., et al.; Constructing Minimal Perfect Hash Functions Using SAT Technology; Proceedings of the AAAI Conference on Artificial Intelligence, 2020, pp. 1668-1675, vol. 34(02), https://doi.org/10.1609/aaai.v34i02.5529.

* cited by examiner

|     | $H_1$ | $H_2$ | $H_3$ |
| --- | --- | --- | --- |
| $y_1$ | 1 | 5 | 2 |
| $y_2$ | 2 | 4 | 5 |
| $y_3$ | 1 | 3 | 4 |
| $y_4$ | 1 | 3 | 1 |
| $y_5$ | 5 | 3 | 3 |

FIG. 2

|   | $H_1$ | $H_2$ | $H_3$ |
|---|---|---|---|
| $y_1$ | 1 | 5 | 2 |
| $y_2$ | 2 | 4 | 5 |
| $y_3$ | 1 | 3 | 4 |
| $y_4$ | 1 | 3 | 1 |
| $y_5$ | 5 | 3 | 3 |

| tuple | $H_1$ | $H_2$ | XOR constraint |
|---|---|---|---|
| $(y_1, 1)$ | 3 | 6 | $x_3 \oplus x_6 \equiv 1$ |
| $(y_2, 1)$ | 5 | 1 | $x_5 \oplus x_1 \equiv 1$ |
| $(y_3, 1)$ | 4 | 8 | $x_4 \oplus x_8 \equiv 0$ |
| $(y_3, 2)$ | 2 | 3 | $x_2 \oplus x_3 \equiv 0$ |
| $(y_3, 3)$ | 5 | 4 | $x_5 \oplus x_4 \equiv 1$ |
| $(y_4, 1)$ | 8 | 7 | $x_8 \oplus x_7 \equiv 0$ |
| $(y_4, 2)$ | 2 | 7 | $x_2 \oplus x_7 \equiv 1$ |
| $(y_5, 1)$ | 4 | 3 | $x_4 \oplus x_3 \equiv 1$ |

40 → (pointing to row $(y_3, 2)$)
44 → (pointing to $H_1, H_2$ columns)
42 → (pointing to XOR constraint column)

FIG. 7

SYSTEMS AND METHODS OF MINIMAL PERFECT HASHING WITH XORSAT FILTERS

FIELD OF THE INVENTION

The present invention relates generally to hash functions, and in particular to generation of minimal perfect hash functions.

BACKGROUND

A minimal perfect hash function (MPHF) for a set Y with n distinct elements is a collision-free mapping from the elements of Y to the set $[n]=\{1, \ldots, n\}$. MPHFs enable efficient access to data stored in large databases by providing a unique index for each key in a set of key-value pairs. This allows the value of each key-value pair to be stored at its associated index in an n-entry table. Since industrial databases are often of significant size, if an MPHF is going to be used, one would want it to use as little extra space as possible.

The information-theoretic limit for MPHFs is $1/\ln 2 \approx 1.44$ bits per key, yet constructions to meet this limit rely on bruteforce and are therefore not practical. Prior art methods of generating minimal perfect hash functions have ranged between 2 and 4 bits per key. Since applications may also consider costs such as build time and query time, MPHF construction and querying should not be so costly as to outweigh the benefit of a compact representation.

SUMMARY

One embodiment of the present invention is a method of computer-implemented method of constructing a minimal perfect hash function. The method includes selecting a set H of k hash functions over a set Y of n keys and building a bipartite graph from keys to hash values using the set Y of keys and the set H of hash functions. Each edge of the bipartite graph has a weight equal to an index of a hash function associated with that edge. The method also includes determining a minimal weight perfect matching of the bipartite graph and generating an XORSAT filter using the minimal weight perfect matching of the bipartite graph, such that a minimal perfect hash function can be performed on an element by querying the XORSAT filter for a result associated with the element.

In a related embodiment, determining the minimal weight perfect matching of the bipartite graph is performed using the Hungarian Algorithm. Alternatively, or in addition, $k=\max(3, \ln n+\ln(\ln n))$. In another related embodiment, the method also includes querying the XORSAT filter for a value X to determine a hash value Z associated with X. Alternatively, or in addition, n is $>2^{15}$. Alternatively, or in addition, n is $>2^{25}$. In another related embodiment, generating the XORSAT filter includes selecting at least two XORSAT filter hash functions, defining a set of constraints using the minimal weight perfect matching and the XORSAT filter hash functions, determining a bit vector satisfying the set of constraints, and generating the XORSAT filter using the bit vector.

BRIEF DESCRIPTION OF THE DRAWINGS

FIG. 2 is a table of exemplary hash values for several hash functions and keys in accordance with an embodiment of the present invention;

FIG. 4 is the table of FIG. 2, including an illustration of a minimal weight perfect matching of the bipartite graph of FIG. 3;

FIG. 7 is a table illustrating generation of an XORSAT filter using the minimal weight perfect matching of FIGS. 4, 5, and 6 in accordance with an embodiment of the present invention.

DETAILED DESCRIPTION

Figure 1:
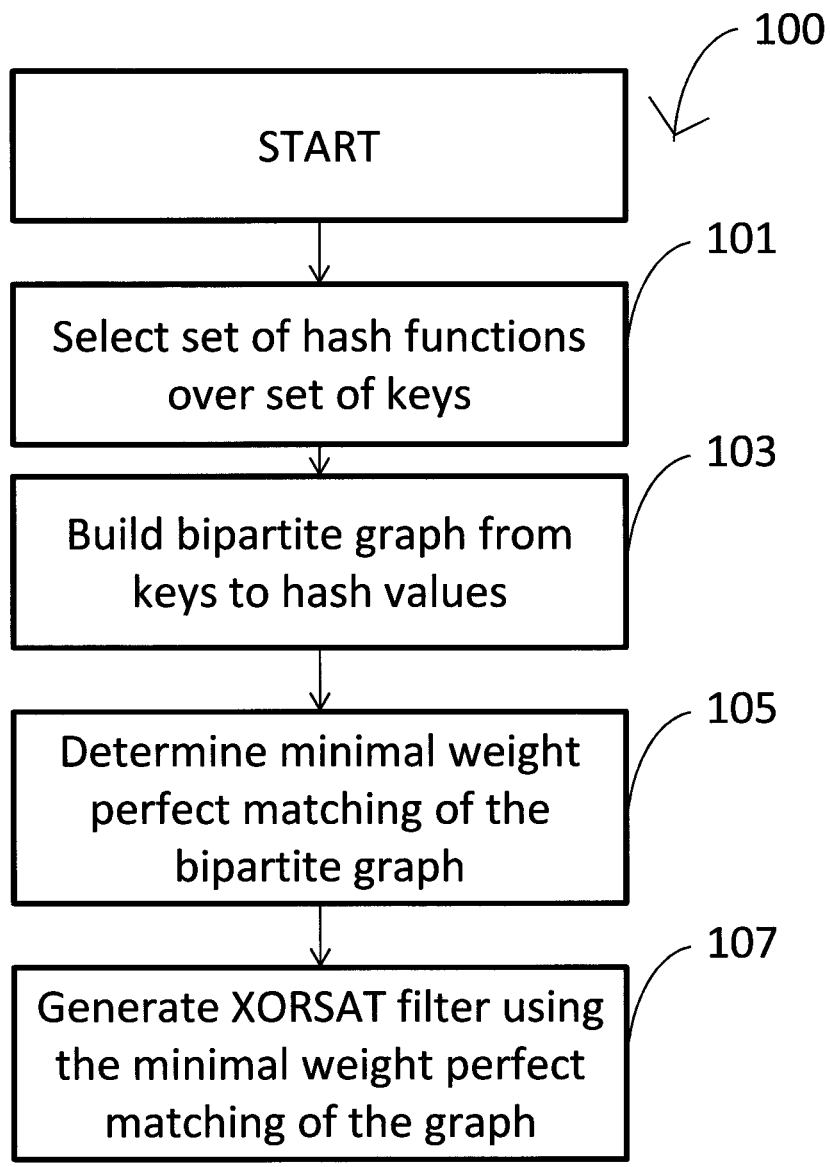
FIG. 1 is a flow chart of a process in accordance with an embodiment of the present invention.

Minimal perfect hash functions (MPHFs) are used to provide efficient access to values of large dictionaries (sets of key-value pairs). There is a need for new methods for generating MPHFs, and the perspective of storage efficiency is an especially important consideration. The information-theoretic limit for MPHFs is $1/\ln 2 \approx 1.44$ bits per key. Prior art methods of generating minimal perfect hash functions have ranged between 2 and 4 bits per key. A method of generating MPHFs in accordance with an embodiment of the present invention uses XORSAT filters to realize a practical approach with long-term storage of approximately 1.83 bits per key.

The MPHFs discussed in accordance with embodiments of the present invention are static MPHFs, i.e., MPHFs where the set Y is immutable and known in advance. These embodiments use on satisfiability (SAT) techniques and utilize a universal family of hash functions.

An embodiment is now discussed which uses approximately 1.83 bits per key and can build MPHFs in $O(n^3)$ steps (though construction is trivially parallelizable). These MPHFs can be queried in $\max(3, \ln n+\ln(\ln n))$ steps in the worst case. Formally, the construction involves storing a minimum-weight perfect matching of a weighted bipartite graph in a space-efficient retrieval structure called an XORSAT filter. Our implemented prototype demonstrates that the approach can produce MPHFs for large datasets (230 keys) with fast query speed (a million queries per second) for low costs.

Minimal Perfect Hash Functions

A minimal perfect hash function (MPHF) for a set Y with n distinct elements is a bijection that maps the elements from Y to the set $[n]=\{1, \ldots, n\}$. Three important tradeoffs play a role when constructing MPHFs: storage space, query speed, and building cost. Most research focuses on lowering the storage space, while having acceptable query speed and building cost.

The probability that a universal function H with range [n] is a minimal perfect hash function for Y is $n!/n^n$. For each element $y_i$ with $i \in [n]$, the probability that $H(y_i)$ and $H(y_j)$ with $(j<i)$ don't collide is $$\frac{n+1-i}{n}.$$

The information theoretic limit $\alpha_n$ is $$\log_2\left(\frac{n^n}{n!}\right)/n$$

bits per element. This limit is roughly 1.44 bits per element for large n, but smaller for small n.

MPHF constructions that realize this bound have been based on brute-force: they evaluate many hash functions on Y and terminate as soon as a minimal perfect hash function is found. As the representation of such a hash function requires on average n bits per element, it follows that, for example, brute-force over a set of 20 elements requires on average evaluating over 43 million ($2^{25.36}$) hash functions.

XORSAT Filters

An XORSAT filter is a space-efficient probabilistic data structure used for testing whether an element is in a set. XORSAT filters are considered here as dictionaries of one-bit items. An XORSAT filter has n bits and k hash functions with range [n]. To retrieve the stored bit associated with an element, k hash functions are evaluated on the element. This results in k entries in the array. If the number of entries with value 1 is even, then the stored bit is 0, otherwise the stored bit is 1. XORSAT filters are constructed as follows: First, an XOR constraint of length k is generated for each of the n elements in the set, with the right-hand side of each constraint being equal to the corresponding bit to be stored. After this, the XORSAT filter is constructed by computing a solution for the conjunction of these XOR constraints.

A 1.83n MPHF Construction

A method of generating an MPHF is now disclosed in accordance with an embodiment of the present invention. The method allows building MPHFs with approximately 1.83n bits per key, and it uses a universal family of k hash functions and returns a bit-vector of m bits. Unlike some other methods, the presently disclosed method does not computing compute the index bit by bit. Rather, the method computes which hash function should be used to obtain the index.

To build an MPHF for a set Y with n elements, given a set of universal hash functions $H_1, \ldots, H_k$ each with range [n], we first create a weighted bipartite graph G=(Y, [n], E), where for all y∈Y and for all i∈[k], (y, $H_i(y)$)∈E, it holds that weight(y, $H_i(y)$)=i.

The weighted bipartite graph is created in such a way that the nodes on the left-hand-side (i.e., the left partition) represent elements of Y and the right-hand-side nodes represent elements from [n]. The hash functions determine how every left-hand-side node is connected to k right-hand-side nodes. That is, for each y∈Y, compute $H_1(y), \ldots, H_k(y)$ and add edges from y to the resulting nodes produced by the hash functions. The weight of each edge is assigned the index of the hash function used, that is, weight(y, $H_i(y)$)=i.

The parameter k should be chosen in a way that guarantees that G possesses a perfect matching. With high probability, G will have a perfect matching when the degree of each left-hand-side node is at least three and the degree of each right-hand-side node is at least two. The right-hand-side nodes will, with high probability, have degree two when the number of edges reaches n(ln n+ln(ln n)). Hence, since every $H_i$ is used to hash n keys, the optimal value for parameter k is max(3, ln n+ln(ln n)).

Let M be a minimum-weight perfect matching of G. M can be found in O($n^3$) steps using the Hungarian Algorithm. M is also the bijective mapping of the MPHF being built. M has weight approximately 1.83n, asymptotically, which was determined experimentally.

The mapping M is stored in a space-efficient retrieval structure such that, for each y, if $H_i(y)$ E M then store ((i, y), 1) (definite presence) and for each j<i store ((j, y), 0) (definite absence).† Such a retrieval structure can be created in O((1.83n)$^3$) steps, takes up one bit of space per element stored, and can be accessed in a small constant number of steps. Both the Hungarian Algorithm and the retrieval structure construction process can benefit from sharding the input into small sets (which can all be processed in parallel), meaning that the MPHF can be created more efficiently than two O($n^3$) steps, though at a determinable, yet practically small loss to space efficiency. The long-term storage of this MPHF construction is equivalent to the size of the retrieval structure which will be approximately 1.83n.

To find the mapping from y to its corresponding index, query the retrieval structure with (I, y), starting with i=1 and increment until 1 is given. Then, the index for y is $H_i(y)$.

Figure 2:
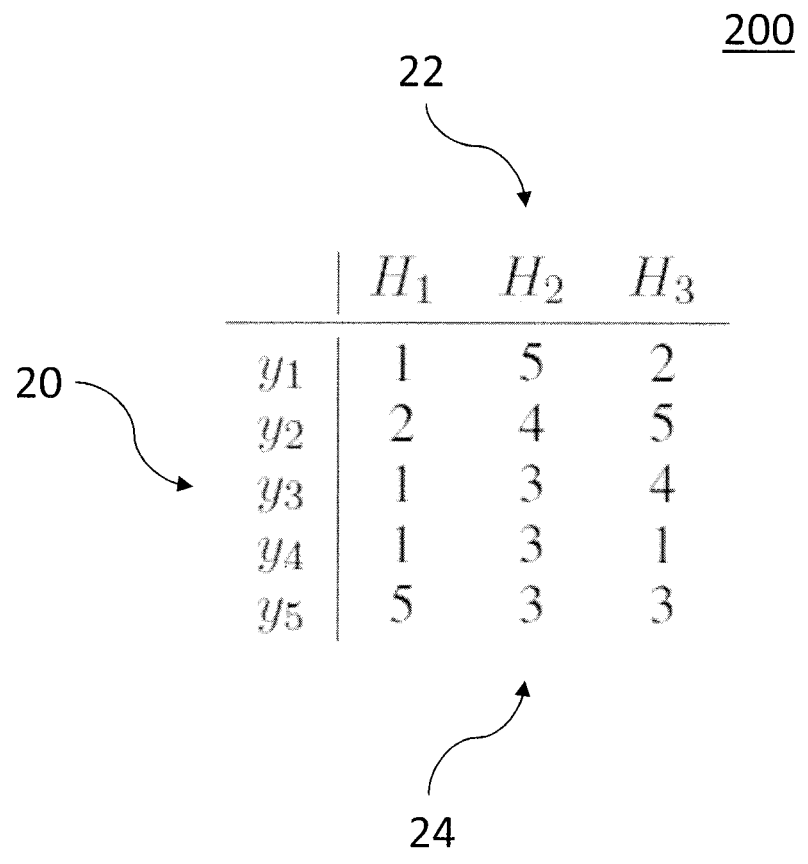

A detailed example is now provided of building an MPHF in accordance with an embodiment of the present invention by storing a minimum weight perfect matching of a bipartite graph in the solution of a k-XORSAT instance. Let Y be the set 20 defined as {y1, y2, y3, y4, y5}, resulting in n=5 and k=max(3, ln 5+ln(ln 5))=3. First, the k hash functions 22 are evaluated on all elements of Y, producing table 200 shown in FIG. 2.

Figure 3:
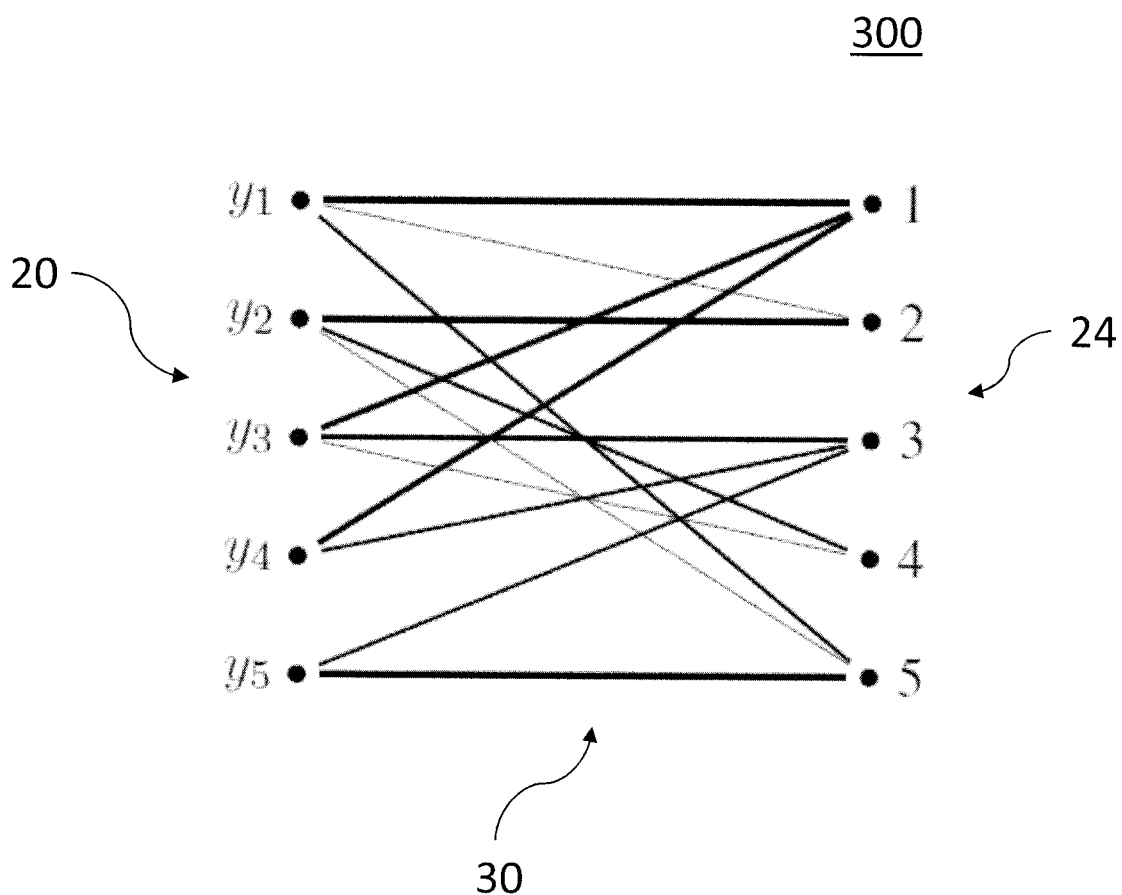
FIG. 3 is a bipartite graph mapping the keys of FIG. 2 to the hash values of FIG. 2 in accordance with the hash functions of FIG. 2.
Figure 4:
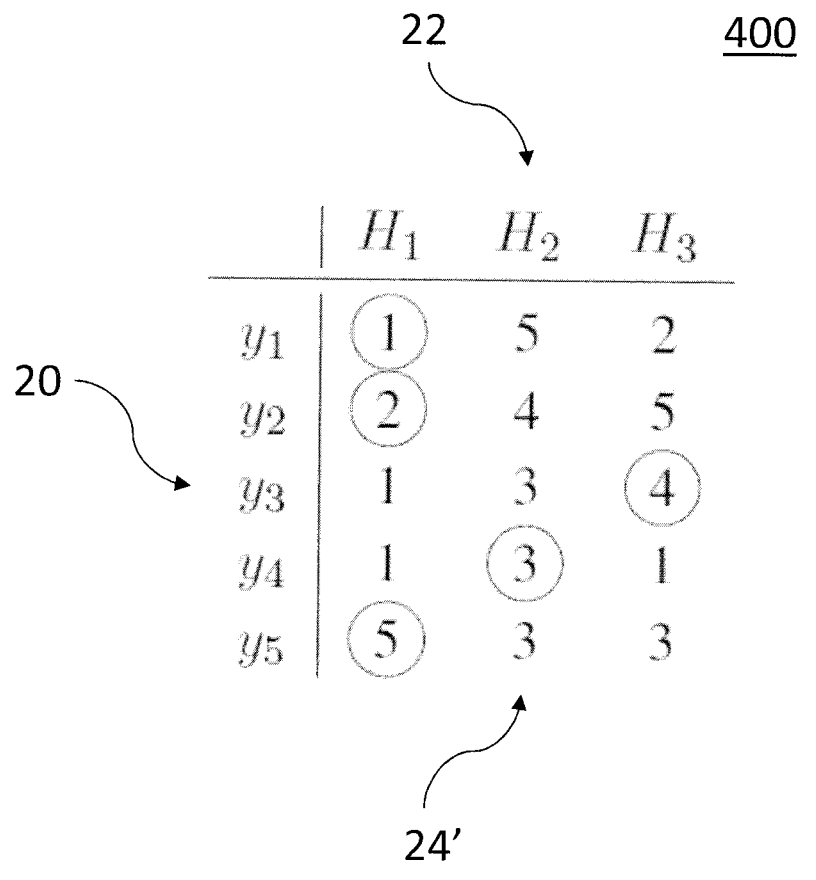
Figure 5:
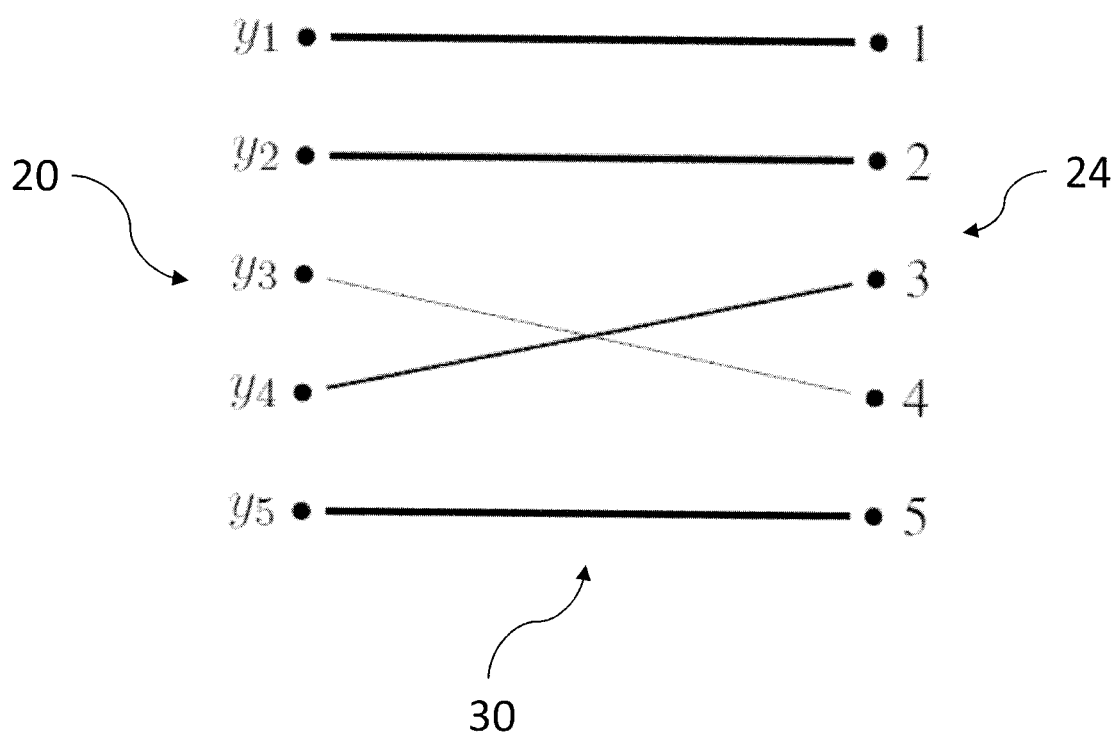
FIG. 5 is a bipartite graph illustrating the minimal weight perfect matching of the bipartite graph of FIG. 3.
Figure 6:
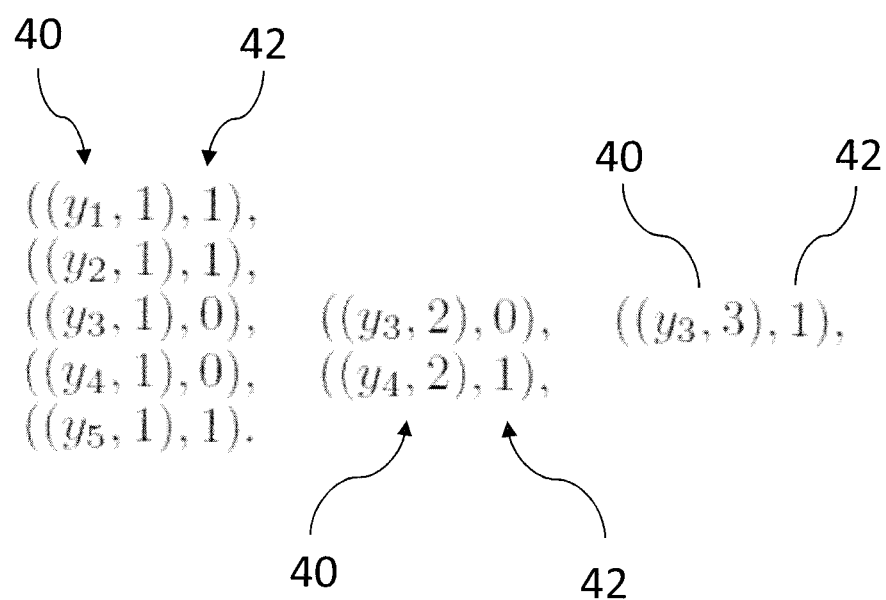
FIG. 6 is a representation of the minimal weight perfect matching illustrated in FIGS. 4 and 5.

Next, with reference to FIG. 3, a bipartite graph 300 is built from the table by adding for each element in Y an edge 30 from the element 20 to the results 24 of the hash functions. Thus, for instance, y1 is connected to 1, 5, and 2. The weight of each edge 30 is equal to the index of the hash function 22 used. For example, edge (y1, 1) has weight 1 and edge (y2, 5) has weight 3. The Hungarian Algorithm is now used to find a minimal weight perfect matching of the bipartite graph. One such matching 24' (which has weight 8) is given in table 400 shown in FIG. 4. This table 400 corresponds to the matching illustrated in graph 500 in FIG. 5. The matching 24' is then stored in an XORSAT filter. For this example, elements 600 are stored as shown in FIG. 6.

Elements are stored in the filter such that the first part of the tuple 40 is the element being filtered on and the second part is one bit of metadata to store (treating the filter like a dictionary of one-bit items). A table 700 showing such a list of tuples 40 and corresponding hash functions 44 and XOR constraints 42 is shown in FIG. 7. Let t denote the number of tuples 40, in this case 8. An XORSAT filter can be constructed using two hash functions 44 with range [t]. In FIG. 7, the number of hash functions 44 is limited for readability, but 5 hash functions may be used in practice to generate an XORSAT filter with high efficiency.

The conjunction of the XOR constraints is satisfiable, for example by assigning the truth value 1 to the variables $x_2$, $x_3$, and $x_5$, and the truth value 0 to the other variables. Thus in this example, the bit vector <01101000> is stored, using 8 bits for 5 elements.

The index of an element of Y is determined by querying the filter a number of times, stopping when it returns 1. In this example, to determine the index of $y_3$, we first query the filter with ($y_3$, 1) and obtain the hashes 4 and 8. Thus, the filter will return 0 because it has 0 at the positions 4 and 8, and 0 @ 0=0. Next, we query the filter with ($y_3$, 2). The filter will again return 0. Finally, we query the filter with ($y_3$, 3). Now it will return 1. This means the MPHF index of $y_3$ is $H_3(y_3)$=4.

A process 100 in accordance with an embodiment of the present invention is described with reference to FIG. 1. The process 100 begins at block 101 where a set H of hash functions are selected. The set H contains a total of k different hash functions. Each of the k hash functions maps every value of a set $Y=\{y_1, y_2, \ldots y_n\}$ of keys to a hash value. The set Y contains n different keys. The process 100 continues at block 103 where a bipartite graph is built. A first half of the bipartite graph includes as nodes the n keys of Y, and a second half of the bipartite graph includes as nodes hash values resulting from applying each of the k hash functions to each of the n keys. The bipartite graph also includes edges connecting the key nodes to the hash value nodes in accordance with the hash functions. The process 100 continues at block 105 where a minimal weight perfect match of the bipartite graph is determined. Each edge in the minimal weight perfect match has a weight equal to an index of the hash function associated with the edge. The process 100 continues at block 107 where an XORSAT filter is generated using the minimal weight perfect matching of the bipartite graph.

Depending on the embodiment, certain acts, events, or functions of any of the methods described herein can be performed in a different sequence, can be added, merged, or left out all together. Not all described acts or events are necessarily required for the practice of any claimed method. Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and steps described in connection with the embodiments disclosed herein can be implemented as electronic hardware, computer software, or combinations of both. To clearly illustrate this interchangeability of hardware and software, various illustrative components, block, modules, and steps have been described above generally in terms of their functionality. Whether such functionality is implemented as hardware or software depends on the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, a DVD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that may not provide all of the features and benefits set forth herein, as some features can be used or practiced separately from others. The scope of the invention is indicated by the appended claims rather than the foregoing description. All changes which come within the meaning and range of equivalency of the claims are to be embraced within their scope.

I claim:

1. A computer-implemented method executed in a processor for constructing a minimal perfect hash function mapping with optimized efficiency in storing and accessing data in a digital database, the method comprising:
   selecting a set H of k hash functions over a set Y of n keys, each of the keys representing an element of data having greater bit size, the hash functions being disparately indexed one relative to the other;
   building a bipartite graph defining a plurality of edges mapping the set Y of keys to respective hash values generated according to different combinations of keys and hash functions from the set H of hash functions, wherein each edge extending between a key and a hash value of the bipartite graph has a weight defined by the index of a hash function from the set H associated with said edge;
   selectively determining a combination of the weighted edges to collectively form a minimal weight perfect matching of the keys to exclusive ones of the hash values in the bipartite graph, the hash value exclusively matched to each key replicating a minimal perfect hash function (MPHF) index of the key for accessing data stored in the digital database associated therewith; and
   generating a satisfiability filter based on the minimal weight perfect matching in the bipartite graph, the satisfiability filter reducing the data stored in the digital database for identifying the MPHF indices of the keys responsive to a query down to a bit vector having a predetermined sequence of single bit values;
   wherein a build time to form a MPHF mapping and a query time for accessing data associated with the elements stored in the digital database are thereby minimized.

2. The method in accordance with claim 1, wherein determining the combination of the weighted edges to collectively form the minimal weight perfect matching of the bipartite graph includes execution of the Hungarian Algorithm.

3. The method in accordance with claim 1, wherein $k=\max(3, \ln n+\ln(\ln n))$.

4. The method in accordance with claim 1, wherein the satisfiability filter is of XORSAT filter type.

5. The method in accordance with claim 4, further comprising querying the XORSAT filter for a query value to effectively determine a minimal perfect hash function value associated with the query value.

6. The method in accordance with claim 4, wherein n is >215.

7. The method in accordance with claim 4, wherein n is >225.

8. The method in accordance with claim 4, wherein generating the satisfiability filter includes:
   selecting at least two XORSAT filter hash functions;
   defining a set of constraints using the minimal weight perfect matching and the XORSAT filter hash functions;
   determining a bit vector satisfying the set of constraints; and
   generating the XORSAT filter using the bit vector.

* * * * *